US011795923B2

(12) United States Patent
Sartorius et al.

(10) Patent No.: US 11,795,923 B2
(45) Date of Patent: Oct. 24, 2023

(54) MACHINE SUPPORT AND WIND POWER INSTALLATION HAVING SUCH A MACHINE SUPPORT

(71) Applicant: Wobben Properties GmbH, Aurich (DE)

(72) Inventors: Florian Sartorius, Leer (DE); Walter Lambertz, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 17/707,420

(22) Filed: Mar. 29, 2022

(65) Prior Publication Data
US 2022/0307484 A1    Sep. 29, 2022

(30) Foreign Application Priority Data
Mar. 29, 2021    (EP) ..................... 21165600

(51) Int. Cl.
| F03D 80/80 | (2016.01) |
| F03D 13/20 | (2016.01) |
| F03D 15/20 | (2016.01) |
| F03D 80/70 | (2016.01) |

(52) U.S. Cl.
CPC .............. *F03D 80/88* (2016.05); *F03D 13/20* (2016.05); *F03D 15/20* (2016.05); *F03D 80/70* (2016.05); *F05B 2240/50* (2013.01); *F05B 2240/912* (2013.01)

(58) Field of Classification Search
CPC .......... F03D 13/20; F03D 80/80; F03D 80/88; F05B 2240/50; F05B 2240/912; F05B 2240/914
See application file for complete search history.

(56) References Cited

U.S. PATENT DOCUMENTS

| 6,232,673 | B1 * | 5/2001 | Schoo ..................... F03D 80/70 290/55 |
| 9,103,326 | B2 * | 8/2015 | Erno ....................... F03D 80/88 |
| 9,476,396 | B2 * | 10/2016 | Fritzsche ............. F02N 11/0866 |
| 9,581,137 | B2 * | 2/2017 | Canedo Pardo ...... F03D 7/0248 |

FOREIGN PATENT DOCUMENTS

| DE | 10 2014 206 703 A1 | 10/2015 | |
| EP |      2740928 A1 * | 6/2014 | ............. F03D 80/50 |

OTHER PUBLICATIONS

Gutzmer et al., Translation of EP 2740928 A1, 2014.*

* cited by examiner

*Primary Examiner* — Courtney D Heinle
*Assistant Examiner* — Danielle M. Christensen
(74) *Attorney, Agent, or Firm* — SEED INTELLECTUAL PROPERTY LAW GROUP LLP (57) ABSTRACT

A machine support for a wind power installation, in particular a gearless wind power installation, wherein the machine support is designed to be rotated about a tower axis by means of an azimuth drive, and has a supporting structure which has a first mechanical interface for connecting the machine support indirectly or directly to an azimuth bearing and a second mechanical interface for assembling a generator or an axle journal on the machine support. It is proposed in particular that the supporting structure has one or a plurality of lateral through openings as access to the azimuth drive and/or the azimuth bearing.

20 Claims, 4 Drawing Sheets

Fig.1

Prior Art

MACHINE SUPPORT AND WIND POWER INSTALLATION HAVING SUCH A MACHINE SUPPORT

BACKGROUND

Technical Field

The invention relates to a machine support for a wind power installation.

Description of the Related Art

Wind power installations are generally known. Said wind power installations have a tower, a nacelle being rotatably mounted on the upper end of said tower. A machine support which supports a generator, a drive shaft for the generator, optionally a gearbox, and a rotor hub having a plurality of rotor blades which for driving the generator rotate in the wind is often disposed in the interior of the nacelle. The generator usually has a generator stator which is fixedly received by the machine support and a generator rotor which internally or externally rotates relative to the generator stator. In other words, machine supports of the previously described type are thus used for connecting the nacelle and the functional components thereof to the tower of the wind power installation.

A machine support of the previously described generic type which by way of an azimuth bearing is rotatably connected to the upper end of the tower is known from DE 10 2014 206 703 A1, wherein the machine support can be rotated about the tower axis by means of the azimuth bearing. The machine support has a supporting structure which has a first mechanical interface for connecting the machine support indirectly or directly to the azimuth bearing and a second mechanical interface for assembling a generator or an axle journal for supporting a generator to the machine support. In the operation of the wind power installation, both static loads such as the masses of the components supported by the machine support, as well as dynamic loads such as the load of the wind acting on the rotor blades, for example, are received and transmitted to the tower by way of the machine support. That machine support has a compact supporting structure having a shell structure which has substantially closed walls and imparts to the machine support the necessary strength for absorbing the loads arising during the operation. An opening for reaching the interior of the nacelle from the machine support is configured in the shell structure. The freedom of movement within the nacelle is however restricted as a result of the construction mode of the machine support, this impeding the servicing and maintenance of the wind power installations.

BRIEF SUMMARY

One or more embodiments are directed to a machine support for a wind power installation, in particular a gearless wind power installation, wherein the machine support is designed to be rotated about a tower axis by means of an azimuth drive, and has a supporting structure which has a first mechanical interface for connecting the machine support indirectly or directly to an azimuth bearing and a second mechanical interface for assembling a generator or an axle journal on the machine support. One or more embodiments are directed to a wind power installation having such a machine support.

One or more embodiments are directed to improving a machine support of the type described at the outset. One or more embodiments are directed to simplifying the accessibility of adjacent regions of the machine support or else of regions on the machine support per se without compromises in terms of stability arising on the machine support. One or more embodiments are directed to specifying a machine support by way of which undiminishedly high loads can be absorbed while simultaneously reducing the inherent mass of the machine support.

The supporting structure according to one embodiment has one or a plurality of lateral through openings as access to the azimuth drive and/or the azimuth bearing.

A person, instead of having to gain access to the nacelle by way of the rearward through opening, henceforth can make their way from the interior of the supporting structure directly into the lateral region of the nacelle about the machine support also by way of the lateral through opening. As a result, it becomes very much easier to obtain access to the azimuth drive and/or to the azimuth bearing of the wind power installation. Potential servicing and maintenance jobs can now be performed in a safer and speedier manner. At the same time, the through openings have the effect of lowering the weight of the supporting structure.

A lateral through opening in the present context is to be understood to be a continuous clearance in the supporting structure which is defined by an opening delimitation, wherein the edge is spaced apart from a plane which is defined by a (vertical) rotation axis of the machine support and a (substantially horizontal) longitudinal axis of the drive train that runs through the second interface on the machine support. In other words, the plane formed by the rotation axis of the machine support and the longitudinal axis of the second interface is thus not intersected by the free area defined by the through opening. According to one refinement, the supporting structure preferably has a plurality of, in particular two, lateral through openings that lie on mutually opposite sides of, and are spaced apart from, the plane defined by the rotation axis and the longitudinal axis running through the second interface of the machine support.

In one preferred design embodiment, the supporting structure has one or a plurality of (first) struts that run from the first to the second interface, wherein the through opening extends in the direction of the strut and preferably at least in regions is delimited by the first strut and by the first and/or the second interface. The mutually spaced apart end regions of the first and the second interface are preferably connected to one another by way of the first struts, as a result of which parts of the loads acting on the second interface are transmitted directly to the rear region of the first interface and to the azimuth bearing at the upper end of the tower that is coupled thereto. The mutually adjacent end regions of the first and the second interface preferably configure a main connection region on the machine support, the mechanical interfaces of the machine support extending in different directions from said main connection region.

The term "front end" of the first interface in the present context is understood to be the region of the machine support in which the second interface for assembling the generator or the axle journal for supporting the generator is disposed. The term "rear end" of the first interface is understood to be the end region on the first interface that is disposed so as to be approximately opposite the second interface.

A possible refinement of the machine support provides that the first and the second interface each are defined in a plane, and the first strut runs so as to be inclined at an angle to the interface planes and preferably is a connecting strut having a partially curved profile. The first strut preferably runs in a direction of extent which is directed so as to be substantially uniform in relation to the interface planes. As a result, an optimized flux of force is achieved in the transmission of force from the first to the second interface and in the opposite direction on the machine support. The first mechanical interface on the machine support has the function of a tower connection portion. The second mechanical interface on the machine support has the function of an assembly portion for the drive train to be received in the nacelle, said drive train being composed at least of a rotor, a rotor hub and a generator of the wind power installation. According to one preferred design embodiment, the machine support has two first struts which run so as to be mutually spaced apart between the mutually spaced apart end regions of the first and the second interface.

According to one preferred refinement, the supporting structure has one or a plurality of second struts which run/runs at the height level of the first interface and approximately parallel to the plane of the first interface. The second strut is preferably configured as a reinforcement strut for the first interface that runs from the front end region of the first interface to the opposite rear end region of the first interface. The reinforcement strut reinforces the first interface and thus the power connection portion of the machine support. At the same time, the second strut in turn distributes parts of the force that is introduced in the region of the second interface to the opposite rear end of the supporting structure on the machine support. A plurality of, in particular two, second struts are preferably disposed on the supporting structure of the machine support. The supporting structure preferably has an identical number of first and second struts.

A refinement provides that the through opening in regions is in each case delimited by a first and a second strut, wherein the first and the second strut define a plane that is spaced apart from the rotation axis of the first interface and preferably runs approximately parallel, wherein the ends of the struts furthermore preferably converge in a point in the rear end region of the first interface. In this way, the through opening is aligned such that a person can easily pass through.

The one through opening, or the plurality of through openings, respectively, is/are in each case preferably configured as a manhole. The through openings in terms of area preferably have a dimension of more than 0.5 m², preferably in terms of area a dimension of more than 1 m², preferably in terms of area a dimension in the range from 1 to 2 m².

As a result of the ends of the first and the second struts converging in a point in the rear end region of the first interface, an optimized introduction of force is effected into that end of the machine support that is opposite the second interface. Peak loads which are introduced by way of the second interface, for instance, can thus be absorbed in a targeted manner and transmitted towards the first interface. When viewed in the direction of the rotation axis of the second interface, the first and the second strut preferably run so as to be mutually parallel, preferably congruent.

According to one preferred embodiment, the supporting structure has two pairs of struts composed in each case of one first and one second strut which define planes that run at a mutual angle α in the range from 5 to 25°. With the aid of the two pairs of struts a uniform distribution of force of possible loads introduced at the first interface is effected across the circumference of the first interface and the azimuth bearing connected thereto.

Each pair of struts in the region of the first interface preferably has two connection points, wherein each connection point is formed from one end of one of the struts of the pair of struts. The connection points are preferably mutually spaced apart in the direction of the (vertical) rotation axis of the machine support, in other words disposed at different height levels.

Both struts of the pair of struts preferably run so as to be mutually inclined such that the struts converge in a point at the rear end region of the first interface. The convergent points of the pairs of struts are preferably mutually spaced apart at the rear end of the first interface. The individual connection points of the first and the second struts are preferably disposed so as to be circumferentially uniformly distributed on the second interface. The second interface is preferably configured in the form of a ring or a flange. A uniform absorption of load is facilitated as a result of the uniform distribution of the connection points.

The supporting structure between the first struts and/or between the second struts preferably has in each case a further through opening as access to or from the machine support.

The supporting structure of the machine support is preferably configured as a strut structure having a plurality of through openings. This further facilitates the access to the various regions of the nacelle. Moreover, a reduced overall weight in comparison to a conventional machine support for a wind power installation of the same output class is preferably derived from the design embodiment of the machine support with the strut structure thereof. The machine support according to the invention by virtue of the flux flow oriented strut structure preferably has at least the same or a higher strength in comparison to a conventional machine support.

A reinforcement element which extends between the first and the second strut and delimits the lateral through opening next to the first and the second strut is preferably configured in the region of the second interface. Such reinforcement elements are preferably assigned to the respective pair of struts connected to the second interface on both sides of the second interface. The reinforcement element is integrally connected to the second interface and on the internal side extends between the first and the second strut and conjointly with the latter configures a contiguous reinforcement structure on the machine support. In one preferred design embodiment the lateral through opening is delimited by regions of the reinforcement element as well as portions of the first and the second strut of a pair of struts of the supporting structure.

According to one preferred embodiment, the supporting structure furthermore has a wall portion which additionally connects the first and the second interface to one another. The wall portion preferably at least in portions extends in an arcuate manner about the rotation axis of the first interface.

In addition to the strut structure, the first and the second interface are preferably connected to one another by way of a wall portion, wherein the wall portion is designed for absorbing potential forces and/or moments which laterally impact the supporting structure and/or arise about the longitudinal axis of the second interface. The wall portion, at least in the region of the first interface, preferably extends on a circular path about the rotation axis of the first interface. The wall portion is preferably inherently curved. As a result of the arcuate contour, optionally inherently curved contour, the wall portion has an increased geometrical moment of inertia such that any deformation of the wall portion as a result of loads acting thereon is better counteracted.

The wall portion, along a portion of the periphery of the first interface, preferably extends on both sides of the second interface, wherein the wall height furthermore preferably decreases from the second interface. The wall portion is thus primarily disposed only in that region of the machine support that is most urgently required for increasing the strength. The wall height of the wall portion preferably decreases continuously from the second interface in the direction of the rear end region at the first interface. The flux of force from the second interface in the direction of the rear end region of the first interface is thus further improved and enables a more uniform distribution of load to the azimuth bearing on the tower of the wind power installation. The wall portion preferably extends at least along half of the periphery of the first interface, preferably approximately along two thirds of the periphery of the first interface.

According to one preferred design embodiment, the first interface has a plurality of receptacles for the azimuth drive which are preferably disposed on a common diameter about the rotation axis of the first interface. The receptacles are preferably externally encased by the wall portion. The first interface between the second strut and the receptacles furthermore preferably has an engagement opening. With the aid of the receptacles on the machine support, a plurality of drive motors can be fastened to the first interface and serve for moving the machine support about the tower axis. The receptacles at least in portions are preferably externally encased by the wall portion that extends in the region of the first interface. The azimuth drive in the form of the drive motors thereof is thus disposed on the internal side of the wall portion and by way of the lateral through openings in the supporting structure at all times readily accessible to the maintenance personnel.

There is preferably in each case an identical number of receptacles on both sides of the plane defined by the rotation axis of the first interface and the longitudinal axis of the second interface.

One preferred embodiment of the machine support between the second strut that runs at the height level of the first interface and the receptacles for the azimuth drive has an engagement opening. The maintenance personnel has access to the drive motors of the azimuth drive and/or to the azimuth bearing on the upper end of the wind power installation tower by way of the engagement opening. The engagement opening at least in portions preferably has the shape of a segment of a circle.

A refinement provides that the planes of the first and of the second interface mutually define an acute angle $\beta > 80°$.

The first and/or the second interface preferably have a flange as a connection/coupling portion.

The planes of the first and the second interface preferably run at an angle $\beta$ in a range from 82° to 88°. This, above all in combination with the strut structure of the machine support, results in an optimized transmission of force from the front end region to the rear end region at the first interface of the machine support.

The first interface preferably has a flange as the connection portion to the azimuth bearing of the wind power installation, and the second interface preferably has a flange as a coupling portion for the generator stator to be received on the machine support or for an axle journal for supporting a generator on the machine support.

The machine support is preferably configured as a casting, wherein furthermore preferably one, a plurality or all of the (first and/or second) struts of the supporting structure have a central web and two bands extending along the longitudinal sides of the central web. A high strength of the supporting structure can be achieved by way of the design embodiment as a—preferably integral—casting having the first interface and the second interface and in particular having the strut structure. Moreover, the flanges of the first and/or the second interface are preferably integrally molded on the supporting structure without any shoulders or undercuts.

According to one preferred design embodiment, the one, plurality or all of, in particular the first and/or second, struts of the supporting structure in the cross section have a shape which corresponds substantially to an I-profile having two bands along the longitudinal sides. The lateral through openings at least in portions are preferably delimited by at least one of the bands on the webs. The bands and the central web of the struts preferably have a rounded transition so as to improve the force profiles within the supporting structure and to further increase the geometrical moments of inertia of the struts.

One embodiment is directed to a wind power installation having a tower and a machine support, which is rotatably mounted on the tower, for receiving a generator for generating electric power.

The machine support of the wind power installation is configured according to one of the embodiments described above.

The advantages and embodiments of the machine support of the first aspect are simultaneously advantages and embodiments of the wind power installation of the second aspect and vice versa, reference therefore being made to the above embodiments for the avoidance of repetitions.

The maintenance of the components disposed within the nacelle is simplified by way of the machine support configured in such a manner, because the maintenance personnel can reach the respectively desired region of the nacelle without great complexity by way of the lateral through openings. In addition to the improved accessibility of the different nacelle regions, the strut structure on the machine support moreover enables an improved flux of force from the second interface of the machine support towards the first interface. Moreover, the machine support has a lower overall weight in comparison to the conventional machine supports in the same output class. The design embodiment according to the invention enables the conception and the construction of larger machine supports and thus of larger types of installations without exceeding any potential predefined or permissible weight limits.

According to one preferred design embodiment of the wind power installation, the machine support is coupled to an azimuth bearing, which is disposed on the upper end of the tower and preferably has a stationary inner ring connected to the tower and an outer ring which is received so as to be rotatable in relation to said inner ring and to which the machine support is fastened, wherein the azimuth bearing on the stationary inner ring preferably has an internal toothing which, for adjusting the machine support relative to the tower, interacts with an azimuth drive disposed on the machine support. The azimuth bearing, configured with the stationary inner ring thereof and the outer ring thereof that is received so as to be rotatable in relation to said inner ring, is preferably screwed to the first interface of the machine support ex works. The assembly of the azimuth bearing, in particular the screw-fitting of the inner ring to the head of the wind power installation tower, can henceforth take place from the internal side in the tower. The establishment of the connection between the machine support and the tower from the external side of the latter can thus be dispensed with. As a result of the externally encircling movable outer ring, the dimensions of the flange on the first interface are preferably consequently increased.

In a design embodiment of the azimuth bearing having an internal toothing on the stationary inner ring, the azimuth drive in radial terms is correspondingly repositioned further towards the inside. The disposal of the drive motors on the first interface thus no longer has any influence on the external dimensions of the supporting structure of the machine support.

BRIEF DESCRIPTION OF THE SEVERAL VIEWS OF THE DRAWINGS

The invention will be described in more detail hereunder by means of a preferred exemplary embodiment with reference to the appended figures in which.

DETAILED DESCRIPTION

Figure 1:
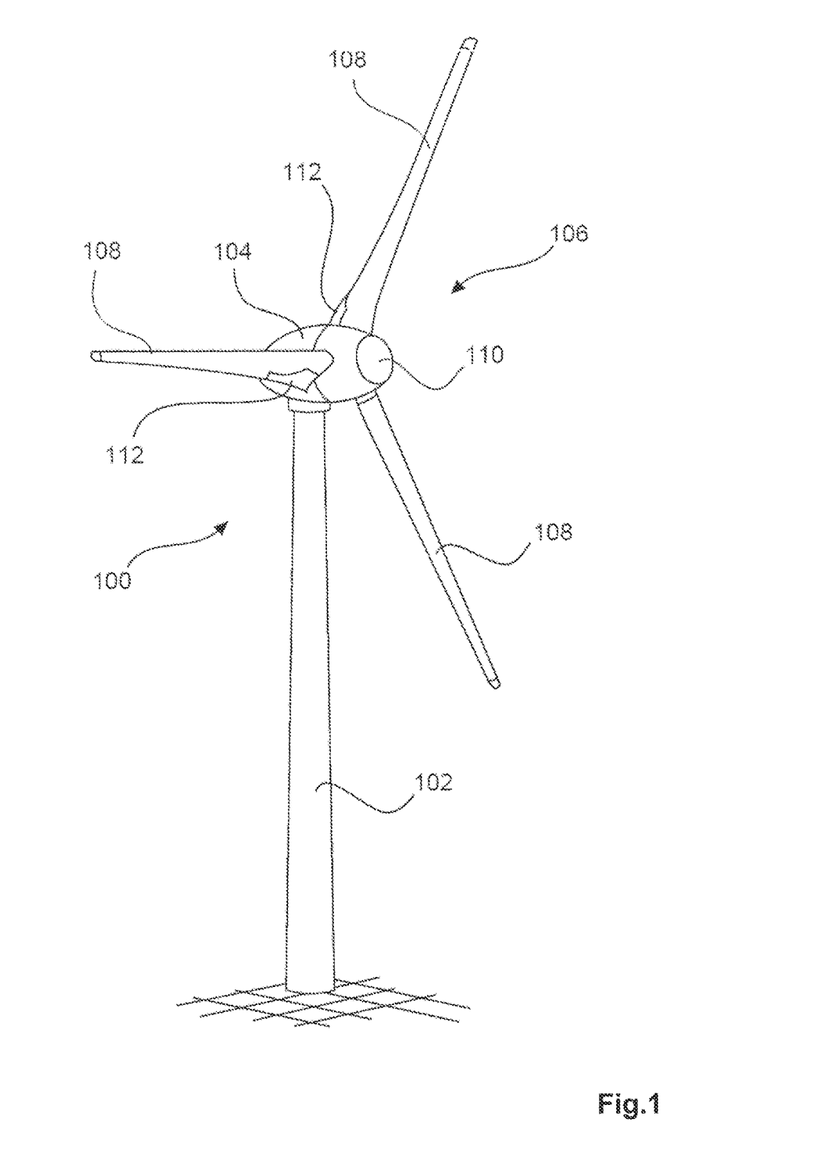
FIG. 1 shows a wind power installation for generating electric power.

FIG. 1 shows a wind power installation 100 having a tower 102 and a nacelle 104. A rotor hub 106 having three rotor blades 108 and a spinner 110 is disposed on the nacelle 104. The rotor blades 108 by way of the rotor blade roots thereof are disposed on the rotor hub 106. During operation, the rotor hub 106 as a result of the air flow acting on the rotor blades is set into rotation and as a result drives a generator which is not illustrated in more detail and is disposed within the nacelle 104.

Figure 2:
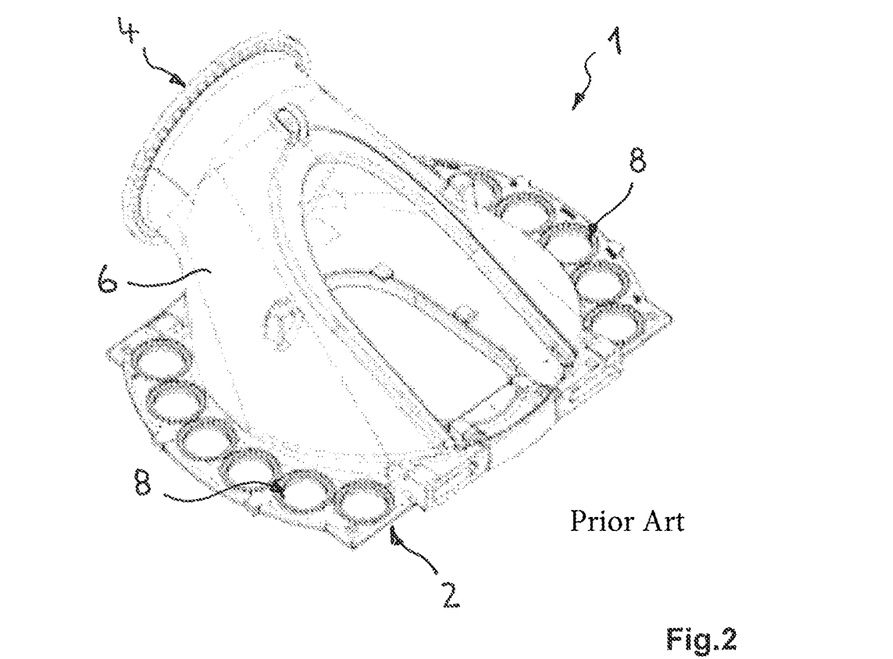
FIG. 2 shows a perspective view of a machine support known from the prior art.

In order for the nacelle 104 to be coupled to the tower 102 of the wind power installation 100, a machine support 1 shown in FIG. 2 was used in the prior art. The machine support 1 has a first mechanical interface 2 for connecting the machine support 1 to an azimuth bearing on the wind power installation and a second mechanical interface 4 for assembling a generator or an axle journal on the machine support. The first interface 2, configured as a type of coupling plate, and the second interface 4, configured as an assembly flange, are connected to one another by way of a wall structure or shell structure 6, respectively, which is almost continuously closed. A plurality of receptacles 8 for drive motors of an azimuth drive to be assembled on the first interface 2 are provided on the first interface 2. As is shown in FIG. 2, the receptacles 8 are disposed about the external side of the wall structure or shell structure 6; in order to reach the drive motors of the azimuth drive the maintenance personnel had to move between the external side of the wall structure or shell structure 6 and the nacelle cladding which is not illustrated and surrounds the machine support, this often not being easy by virtue of the limited available space.

Figure 3:
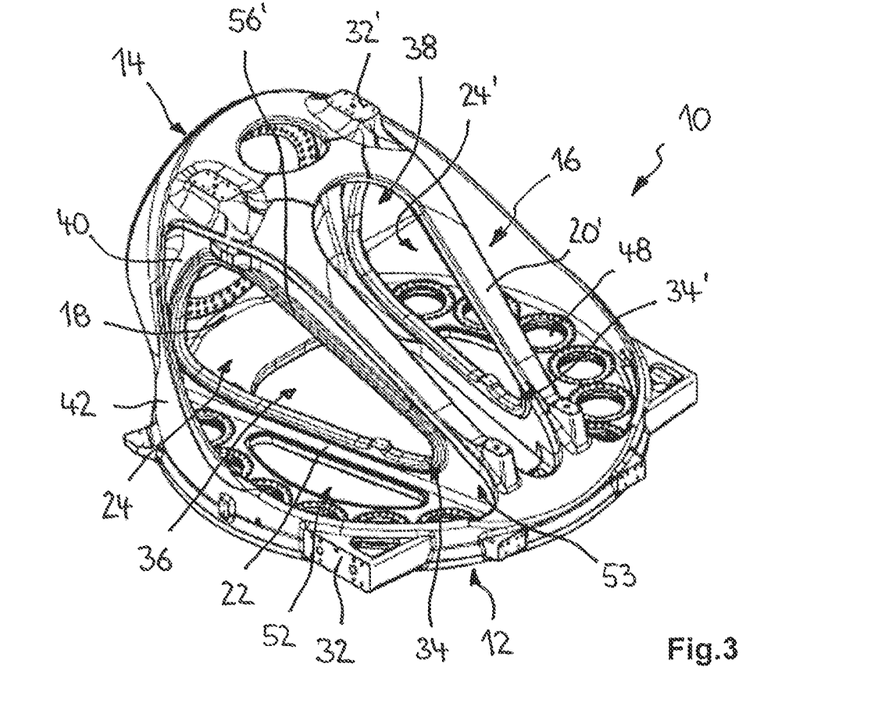
FIG. 3 shows a perspective view of a machine support according to one embodiment of the invention.

In contrast to FIG. 2, FIG. 3 shows a machine support 10 according to the present invention which has a first mechanical interface 12 for connecting the machine support indirectly or directly to an azimuth bearing. The machine support 10 furthermore comprises a second interface 14 for assembling a generator or an axle journal of the wind power installation on the machine support 10. The machine support 10 has a supporting structure 16 by means of which the first interface 12 and the second interface 14 are connected to one another. The supporting structure 16 has a main connection region 18 of the first and the second interface.

Figure 6:
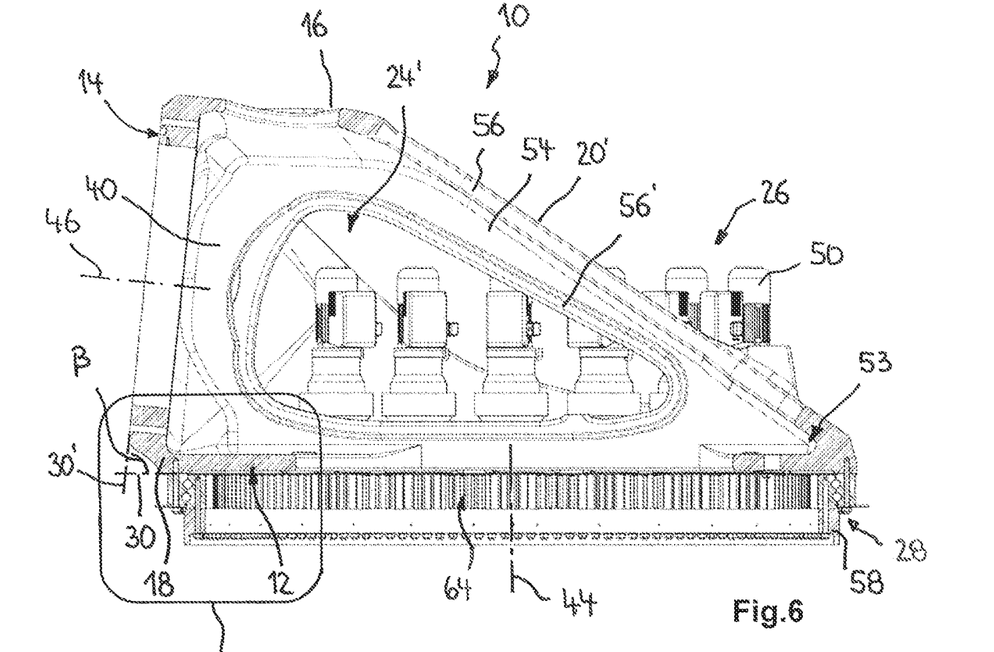
FIG. 6 shows a view of a machine support according to FIG. 3, assembled on an azimuth bearing.
Figure 7:
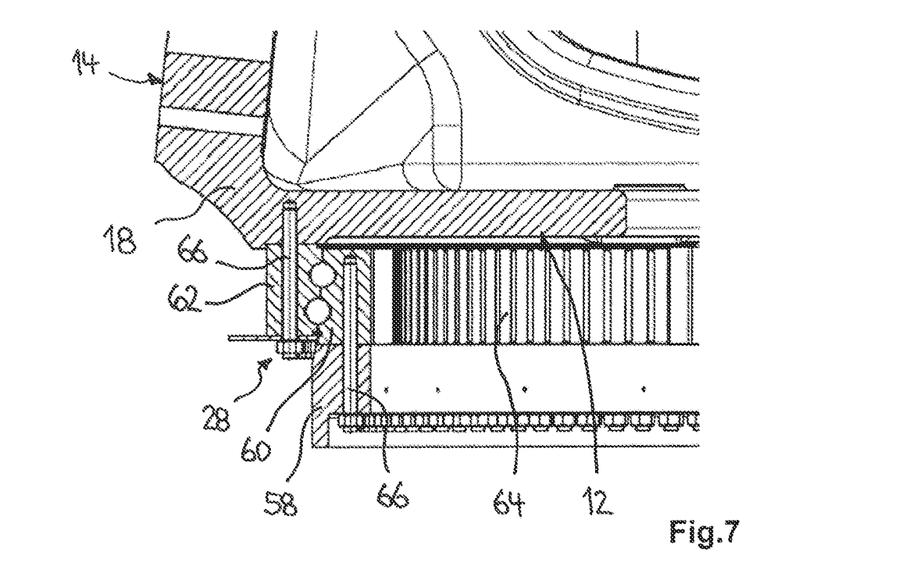
FIG. 7 shows a view of the encircled detail VII shown in FIG. 6.

The supporting structure 16 furthermore has a plurality of struts 20, 20', 22, 22' which run from the first interface 12 to the second interface 14. The supporting structure 16 moreover has a plurality of lateral through openings 24, 24' as access to an azimuth drive 26 and/or to an azimuth bearing 28 connected to the first interface 12 (FIGS. 6 and 7).

The first and the second interface 12, 14 each are defined along a plane 30, 30'. The supporting structure 16 has a plurality of first struts 20, 20' which connect the end regions of the first and the second interface 12, 14 that lie opposite the main connection region 18 to one another. The supporting structure 16 furthermore has a plurality of second struts 22, 22' which run at the height level of the first interface so as to be approximately parallel to the plane 30 of the first interface 12. The second struts 22, 22' are configured as reinforcement struts for the first interface 12.

The lateral through openings 24, 24' extend in the direction of the respectively assigned first strut 20, 20' and/or second strut 22, 22'. In one embodiment of the machine support 10 the lateral through opening in regions is delimited by the first strut 20, 20' and by the first and/or the second interface 12, 14. In a further embodiment of the machine support 10 the lateral through opening 24, 24' is in each case delimited by a first and a second strut 20, 22; 20', 22'.

A plurality of coupling portions 32, 32' by way of which parts or portions of a frame supporting the nacelle 104 can be assembled or fastened are configured on the machine support 10, in particular on the periphery of the machine support. As can be furthermore seen from FIG. 3, the supporting structure 16 has two pairs of struts 34, 34' composed in each case of one first and one second strut 20, 22; 20', 22.

Figure 5:
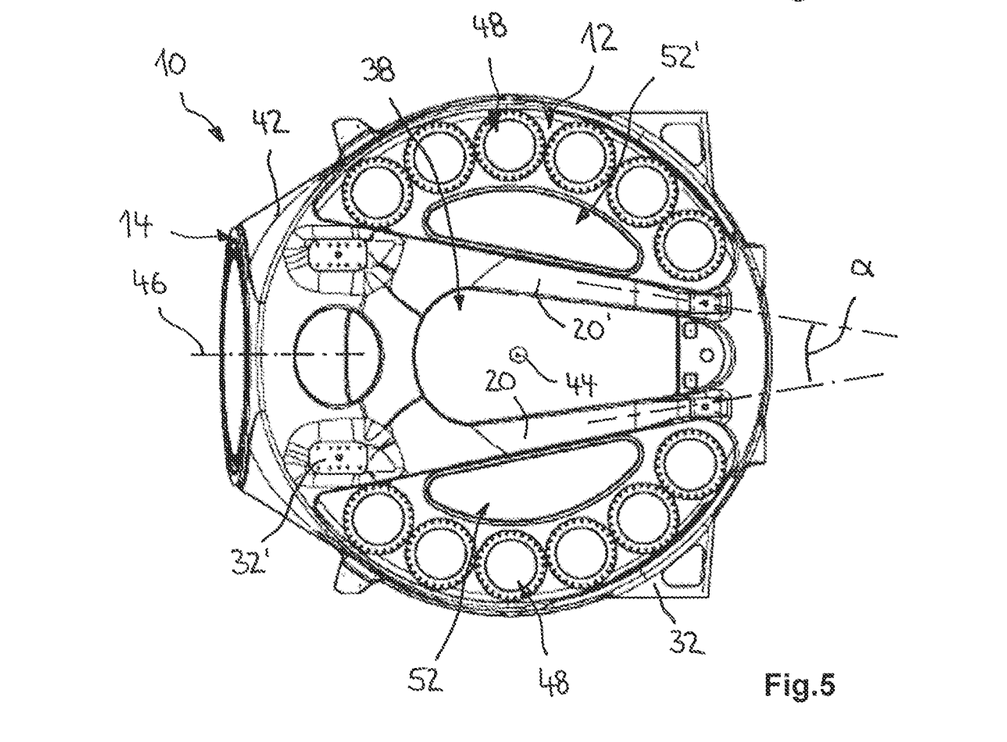
FIG. 5 shows a plan view of the machine support according to FIG. 3.

As illustrated by FIGS. 3 and 5, the supporting structure between the first struts 20, 20' and/or between the second struts 22, 22' has in each case a further through opening 36, 38 as access to or from the machine support 10. In particular, the maintenance personnel by way of the through opening 36 reaches the machine support 10 from the interior of the tower 102, and from said machine support 10 by way of the through openings 24, 24', 38 reaches the remaining regions of the nacelle 104. A reinforcement element 40 which extends between the first and the second strut 20, 22; 20', 22' and delimits the lateral through openings 24, 24' next to the first and the second strut is configured on the internal side of the second interface 14 that faces the interior space of the machine support 10.

Figure 4:
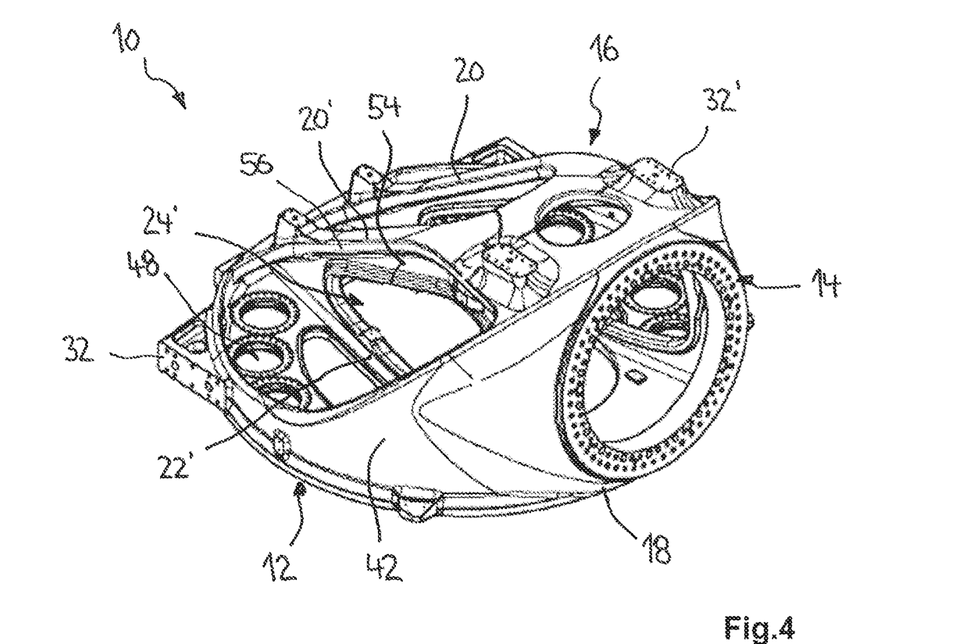
FIG. 4 shows a further perspective view of the embodiment of a machine support according to FIG. 3.

As can be seen from FIG. 4, the supporting structure 16 has a wall portion 42 which additionally connects the first and the second interface 12, 14 to one another. In one embodiment of the machine support 10, the wall portion 42 in portions extends in a circular manner about a rotation axis 44 formed by the first interface 12 (FIGS. 5, 6). The second interface 14 has a longitudinal axis 46 which runs through the rotation axis 44. The rotation axis 44 and the longitudinal axis 46 run at a mutual angle which is unequal to 90°.

The rotation axis 44 and the longitudinal axis 46 define a plane, wherein the lateral through openings 24, 24' are disposed so as to be spaced apart therefrom. Furthermore, the wall portion 42 along a portion of the periphery of the first interface 12 extends on both sides of the second interface 14. The wall height of the wall portion here decreases from the first interface in the direction of the rear end region at the first interface 12.

The first interface 12 furthermore comprises a plurality of receptacles 48 for an azimuth drive that are preferably disposed on a common diameter about the rotation axis 44 of the first interface. The receptacles 48 are externally encased by the wall portion 42, cf. FIGS. 3 to 5.

The first interface 12 between the receptacles 48 and the second struts 14 of the supporting structure 16 preferably has engagement openings 52, 52'. As can furthermore be seen from FIG. 5, the first and the second strut 20, 22; 20', 22' define a plane which runs so as to be spaced apart from, and approximately parallel to, the rotation axis of the first interface 12. FIG. 4 furthermore shows that the ends of the first and the second strut 20, 22; 20', 22' converge in a convergence point 53 in the rear end region of the first interface 12.

The pairs of struts 34, 34' of the supporting structure 16 each define planes which run at a mutual angle α in the range from 5 to 25°. Proceeding from the second interface 14, the spacing between the pairs of struts 34, 34' continuously decreases in the direction of the end region of the first interface. However, the conversion points 53 of the pairs of struts are disposed at a mutual spacing in the end region of the first interface. The dimension of the spacing is approximately one third of the diameter of the second interface 14.

The machine support 10 is configured as a casting. The machine support 10 including the supporting structure 16 and the first and the second interface 12, 14 configured thereon is made from one piece, preferably as a casting. The first and/or second struts 20, 20', 22, 22' have a central web 54 and two bands 56, 56' extending along the longitudinal sides of the central web 54.

FIG. 6 shows a lateral sectional view of the machine support 10 which by way of the first interface 12 thereof is connected to the azimuth bearing 28 by way of which the machine support 10 is movable in relation to the tower 102 of the wind power installation 100. An azimuth drive 26 having a plurality of drive motors 50 is used for moving the machine support and the nacelle 104 coupled to the machine support 10.

As can furthermore be seen from FIG. 6, the first struts 20, 20' run so as to be inclined at an angle to the interface planes 30, 30' of the first and the second interface 12, 14. The planes 30, 30' of the first and the second interface 12, 14 run at a mutual acute angle β of more than 80°. The first and the second interface 12, 14 each comprise a flange as a connection/coupling portion to the azimuth bearing 28 or to a generator, not shown in more detail, in particular a generator stator.

The connection region between the first interface 12 and the azimuth bearing 26 is shown in detail in FIG. 7. The azimuth bearing 26 has an inner ring 60 which is fixedly connected to the upper segment 58 of the tower 102 and an outer ring 62 which is received so as to be rotatable on the inner ring 60. The outer ring 62 is fastened to the first interface 12 by way of a plurality of screw connections 66. The stationary inner ring 60 has an internal toothing 64, the azimuth drive 26, in particular the drive motors 50, received on the first interface interacting with said internal toothing 64. A rotating movement of the drive motors causes an adjustment movement of the machine support 10 relative to the stationary inner ring 60 of the azimuth bearing 28.

As can be seen from FIG. 7, the inner ring 60 is also connected to the upper segment 58 of the tower 102 by way of a plurality of screw connections 66. As can furthermore be seen, the azimuth bearing by way of the inner ring thereof is screwed to the upper segment 58 from the internal side of the tower 102.

LIST OF REFERENCE SIGNS

1, 10 Machine support
2, 12 First interface
4, 14 Second interface
6 Wall structure/shell structure
8 Receptacle
16 Supporting structure
18 Main connection region
20, 20' First strut
22, 22' Second strut
24, 24' Through opening
26 Azimuth drive
28 Azimuth bearing
30, 30' Plane
32, 32' Coupling portion
34, 34' Pair of struts
36, 38 Through opening
40 Reinforcement element
42 Wall portion
44 Rotation axis
46 Longitudinal axis
48 Receptacle
50 Drive motors
52, 52' Engagement opening
53 Convergence point
54 Central web
56, 56' Band
58 Segment
60 Inner ring
62 Outer ring
64 Internal toothing
66 Screw connection
100 Wind power installation
102 Tower
104 Nacelle
106 Rotor hub
108 Rotor blade
110 Spinner The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A machine support for a wind power installation, comprising:
 a supporting structure having:
  a first mechanical interface for connecting the machine support indirectly or directly to an azimuth bearing and a second mechanical interface for assembling a generator or an axle journal on the machine support,
 wherein the machine support is configured to be rotated about a tower axis by an azimuth drive,
 wherein the supporting structure has one or more lateral through openings that provides access to at least one of the azimuth drive or the azimuth bearing, wherein the supporting structure has one or more first struts that extends from the first mechanical interface to the second mechanical interface, wherein each of the one or more lateral through openings extend along a respective one of the one or more first struts, wherein the first mechanical interface and the second mechanical interface each are defined in a respective interface plane, and the one or more first struts extend so as to be inclined at an angle to the interface planes, wherein the supporting structure has one or more second struts extending at a height level of the first mechanical interface and approximately parallel to the interface plane of the first mechanical interface, and wherein the one or more lateral through openings is, in each case, delimited by a respective first strut of the one or more first struts and a respective second strut of the one more second struts, wherein the respective first strut and the respective second strut define a plane that extends spaced apart from and approximately parallel to a rotation axis of the first mechanical interface, wherein ends of the respective first strut and of the respective second strut, defining the plane, converge in a point in an end region of the first mechanical interface.

2. The machine support according to claim 1, wherein the one or more first struts is a connecting strut having a partially curved profile.

3. The machine support according to claim 1, wherein the supporting structure is configured as a reinforcement strut for the first mechanical interface.

4. The machine support according to claim 1, wherein the supporting structure has two pairs of struts composed, in each case, of one first strut and one second strut defining planes that extend at a mutual angle in a range from 5° to 25°.

5. The machine support according to claim 1, wherein a reinforcement element extends between the one or more first strut and the one or more second strut and delimits the one or more lateral through openings next to the first strut and the second strut in a region of the second mechanical interface.

6. The machine support according to claim 1, wherein the supporting structure between the first struts and/or between the second struts has, in each case, a through opening providing access to or from the machine support.

7. The machine support according to claim 1, wherein the one or more lateral through openings, at least in regions, is delimited by the one or more first struts and by at least one of the first mechanical interface or the second mechanical interface.

8. The machine support according to claim 1, wherein the supporting structure has a wall portion that connects the first mechanical interface and the second mechanical interface to one another and, at least in portions, extends in an approximately circular manner about a rotation axis of the first mechanical interface.

9. The machine support according to claim 8, wherein the wall portion, along a portion of the periphery of a first mechanical interface, extends on both sides of the second mechanical interface.

10. The machine support according to claim 8, wherein the first mechanical interface has a plurality of receptacles for the azimuth drive that are disposed on a common diameter about the rotation axis of the first mechanical interface and are externally encased by the wall portion, and wherein the first mechanical interface between the second strut and the receptacles has an engagement opening.

11. The machine support according to claim 1, wherein the planes of the first mechanical interface and of the second mechanical interface extend at a mutual acute angle that is greater than 80°.

12. A wind power installation, comprising:
a tower,
a rotor shaft, and
a machine support rotatably mounted on the tower and configured to receive at least one generator for generating electric power, wherein the machine support is the machine support according to claim 1.

13. The wind power installation according to claim 12, wherein the machine support is coupled to an azimuth bearing, which is disposed on an upper end of the tower, wherein the azimuth bearing has a stationary inner ring connected to the tower and an outer ring received so as to be rotatable in relation to the inner ring and to which the machine support is fastened.

14. The wind power installation according to claim 13, wherein the azimuth bearing on the stationary inner ring has an internal toothing which, for adjusting the machine support relative to the tower, interacts with an azimuth drive disposed on the machine support.

15. The wind power installation according to claim 12, wherein the wind power installation is a gearless wind power installation.

16. A supporting structure, comprising:
a first mechanical interface for connecting a machine support indirectly or directly to an azimuth bearing and a second mechanical interface for assembling a generator or an axle journal on the machine support,
one or more first struts, and
one or more second struts,
wherein the machine support is configured to be rotated about a tower axis by an azimuth drive,
wherein the supporting structure has one or more lateral through openings that provides access to at least one of the azimuth drive or the azimuth bearing,
wherein the machine support is configured as a casting, wherein at least one of the one or more first or second struts of the supporting structure have a central web and two bands extending along the longitudinal sides of the central web.

17. A wind power installation, comprising:
a tower, and
a machine support rotatably mounted on the tower and configured to receive at least one generator for generating electric power, wherein the machine support is the machine support according to claim 16.

18. The wind power installation according to claim 17, wherein the machine support is coupled to an azimuth bearing, which is disposed on an upper end of the tower, wherein the azimuth bearing has a stationary inner ring connected to the tower and an outer ring received so as to be rotatable in relation to the inner ring and to which the machine support is fastened.

19. The wind power installation according to claim 18, wherein the azimuth bearing on the stationary inner ring has an internal toothing which, for adjusting the machine support relative to the tower, interacts with an azimuth drive disposed on the machine support.

20. The wind power installation according to claim 17, wherein the wind power installation is a gearless wind power installation.

* * * * *